(12) United States Patent
Lipscomb et al.

(10) Patent No.: US 12,174,054 B1
(45) Date of Patent: *Dec. 24, 2024

(54) FLUID LEVEL SENSING SYSTEMS, METHOD, AND APPARATUS

(71) Applicants: Brian E. Lipscomb, Sedro-Woolley, WA (US); William Carl Garrison, Bow, WA (US)

(72) Inventors: Brian E. Lipscomb, Sedro-Woolley, WA (US); William Carl Garrison, Bow, WA (US)

(73) Assignee: Brian Lipscomb, Sedro Woolley, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,419

(22) Filed: Dec. 29, 2022

Related U.S. Application Data

(63) Continuation of application No. 16/653,860, filed on Oct. 15, 2019, now Pat. No. 11,543,281.

(60) Provisional application No. 62/745,797, filed on Oct. 15, 2018.

(51) Int. Cl.
  *G01F 23/44* (2006.01)
  *G01P 15/18* (2013.01)

(52) U.S. Cl.
  CPC ............ *G01F 23/443* (2013.01); *G01P 15/18* (2013.01)

(58) Field of Classification Search
  CPC ............................... G01F 23/443; G01P 15/18
  See application file for complete search history.

(56) References Cited

U.S. PATENT DOCUMENTS

| | | |
|---|---|---|
| 7,463,953 B1 | 12/2008 | Lee et al. |
| 8,226,371 B2 | 7/2012 | Kochan |
| 9,170,148 B2 | 10/2015 | Bayley et al. |
| 9,234,828 B2 | 1/2016 | Baron et al. |
| 2009/0281686 A1 | 11/2009 | Smith et al. |
| 2017/0075363 A1 | 3/2017 | Steinke |
| 2019/0162573 A1 | 5/2019 | Zahn |

OTHER PUBLICATIONS

Alber J. W, "THree-Axis Tilt for Articulated Profiler," Oceans 2018 MTS/IEEE Charleston (Year: 2018).*

* cited by examiner

*Primary Examiner* — Lee E Rodak
*Assistant Examiner* — Sangkyung Lee
(74) *Attorney, Agent, or Firm* — Michael R. Schacht; Schacht Law Office, Inc.

(57) ABSTRACT

A fluid level sensing system comprises a sensor float assembly, a sensor control module comprising a sensor processor, and a sensor cable. An accelerometer arranged within the float chamber in a fixed orientation relative to a float axis. The accelerometer is capable of determining movement in at least first and second reference axes. The sensor cable is operatively connected between the float processor and the sensor processor. Movement of the float enclosure relative to the reference point is limited. The accelerometer generates and transfers to the float processor first and second sets of data representative of movement along the first and second reference axes. The float processor generates and transfers to the sensor processor pitch data associated with the float enclosure based on the first and second sets of data. The sensor processor generates a status signal and/or a control signal based on the pitch data.

23 Claims, 6 Drawing Sheets

FLUID LEVEL SENSING SYSTEMS, METHOD, AND APPARATUS

RELATED APPLICATIONS

This application, U.S. patent application Ser. No. 18/148,419 filed Dec. 29, 2022, is a continuation application of U.S. patent application Ser. No. 16/653,860 filed Oct. 15, 2019, now U.S. Pat. No. 11,543,281 issued Jan. 3, 2023.

U.S. patent application Ser. No. 16/653,860 claims benefit of U.S. Provisional Application Ser. No. 62/745,797 filed Oct. 15, 2018.

The contents of all related applications are incorporated herein by reference.

BACKGROUND

The sensing of fluid levels to facilitate the monitoring and controlling fluid levels is well-known. Fluid level sensing systems and methods are commonly employed as part of systems configured to transfer fluids to where they are desired and to remove fluids from where they are unwanted. A fluid storage reservoir, pump(s) or valve(s), and fluid level sensor(s) are commonly configured to form a system for transferring fluids.

Fluid level sensing devices can generally be divided into one of two categories: stationary fluid level sensors and floating fluid level sensors. Stationary fluid level sensors are secured in or upon the reservoir and employ sensing technologies such as pressure, capacitance, conductance, ultrasonic, microwave, thermal, mass, optical, and the like to measure fluid level. Floating sensors are typically suspended by a weight, or otherwise supported or tethered, relative to a fixed point in the reservoir. The position and/or orientation of the floating sensor are used to measure fluid level. When tethered, a length of the tether cable from the weight or tethered point to the distal sensing element affect the float sensing range. The present invention is of particular significance when applied to floating fluid level sensors, and that application of the present invention will be described herein in detail.

Numerous methods have been implemented for signaling the movement of the float suspended in the medium and thus indicating the fluid level. Potentiometers in operational contact with a float may be used when multiple level readings are required such as with a gauge. Switches employing mercury, rolling ball, or other methods that provide an electrical contact closure are also common and generally provide a discrete indication of the float being above or below a predetermined trip point.

Many level control implementations are as simple as a single float conducting or interrupting the current flow to a pump or valve. More complex implementations utilize a plurality of floats to indicate various levels in the reservoir such as low, stop, start, boost, and high levels. When multiple fluid levels are sensed, a controller may be used to implement logic based on the multiple fluid levels and/or other related parameters.

Fluid level sensing systems and methods typically represent tradeoffs with maintenance, initial cost, ease of installation, troubleshooting, and reliability. Stationary sensors can be costly or require frequent maintenance, while floating sensors can be difficult to properly install and set. Wiring required for multiple floats presents additional installation and maintenance costs and increases troubleshooting complexities. Further, floating sensors often fail because fluid wicks down the wiring and fouls the connections and/or because the wiring becomes entangled with other floats.

Consequently, the need exists for fluid level sensing systems and methods that are reliable, inexpensive, and low maintenance, provide a plurality of signaling measurements, and/or are simple to install, operate, and troubleshoot.

SUMMARY

The invention is a fluid level signaling and control system for electrically operated pumps, valves, alarms, and gauges. Typically the invention will be implemented by disposing the sensor in a vessel and connecting the signaling cable to the remote controller. The sensor disposed in the vessel is secured or suspended at a predetermined elevation suitable for the tether to freely move between 0 and 180 degrees or a subset thereof. Gravity acts to pull the sensor towards the center of the earth while the sensor's buoyancy overcomes this gravitational force when in contact with the fluid medium and forces it away from the earths center.

An accelerometer sensitive along three axis is used to measure these gravitational forces applied to the sensor as it is suspended in the fluid medium. The microcontroller utilizes these measurements to determine the orientation of the sensor and calculate the pitch and roll angles. These calculated angles have a mathematical relationship to the elevation of the fluid in the tank.

The sensor communicates this orientation information via the signal cable to the remote controller using a serial data protocol conveyed by a low voltage electrical current loop, or alternatively a PWM signal or analog voltage. The controller compares the sensor orientation to previously saved values to determine what actions to execute.

The inventions various embodiments provide methods for keeping a fluid below a predetermined level, above a predetermined level, gauging the fluid level and alarming at programmable preset fluid levels and sensor anomalies.

The present invention may be embodied as a fluid level sensing system for sensing the level of fluid in relationship to a fixed point comprising a sensor float assembly, a sensor control module, a sensor cable, and a reference point. The sensor float assembly comprises a float enclosure defining a float chamber and a float axis and an accelerometer arranged within the float chamber in a fixed orientation relative to the float axis. The accelerometer is capable of determining movement in at least first, second, and third reference axes of a three-axis coordinate system. The first reference axes is in a predetermined relationship with the float axis. A float processor is operatively connected to the accelerometer. The sensor control module comprises a sensor processor and a sensor cable operatively connected between the float processor and the sensor processor. The reference point is defined as the fixed point. During operation of the fluid level sensing system, a position of the reference point within the three-axis coordinate system is fixed, A first portion of the sensor cable is arranged at the reference point and a second portion of the sensor cable is fixed relative to the float enclosure such that the sensor cable tethers the float enclosure to the reference point and allows movement of the float enclosure such that the float axis is movable relative to the first, second, and third axes of the three-axis coordinate system. The accelerometer generates and transfers to the float processor a first set of data representative of movement along the first reference axis, a second set of data representative of movement along the second reference axis, and a third set of data representative of movement along the third reference axis. The float processor generates and transfers to the sensor processor pitch data associated with the float enclosure based on the first, second, and third sets of data. The sensor processor generates at least one of a status signal and a control signal based on the pitch data generated by the float processor.

The present invention may also be embodied as a fluid level monitoring and control system for sensing the level of fluid within a fixed reservoir containing fluid, comprising a fluid control device, a sensor float assembly, a sensor control module, a sensor cable, and a reference point. The fluid control device is capable of controlling flow of fluid. The sensor float assembly comprises a float enclosure defining a float chamber and a float axis and an accelerometer arranged within the float chamber in a fixed orientation relative to the float axis. The accelerometer is capable of determining movement in at least first, second, and third reference axes of a three-axis coordinate system. The first reference axes is in a predetermined relationship with the float axis. The float processor is operatively connected to the accelerometer. The sensor control module comprises a sensor processor. The sensor cable is operatively connected between the float processor and the sensor processor. The reference point is defined as the fixed point. During operation of the fluid level monitoring and control system, a position of the reference point within the three-axis coordinate system is fixed. A first portion of the sensor cable is arranged at the reference point and a second portion of the sensor cable is fixed relative to the float enclosure such that the sensor cable tethers the float enclosure to the reference point and allows movement of the float enclosure such that the float axis is movable relative to the first, second, and third axes of the three-axis coordinate system. The accelerometer generates and transfers to the float processor a first set of data representative of movement along the first reference axis, a second set of data representative of movement along the second reference axis, and a third set of data representative of movement along the third reference axis. The float processor generates and transfers to the sensor processor pitch data associated with the float enclosure based on the first, second, and third sets of data. The sensor processor generates at least one of a status signal and a control signal based on the pitch data generated by the float processor. The fluid control device is operated based on the control signal.

The present invention may also be embodied as a method of sensing fluid level within a fixed reservoir comprising the following steps. A sensor float assembly is provided. The sensor float assembly comprises a float enclosure defining a float chamber and a float axis and an accelerometer arranged within the float chamber in a fixed orientation relative to the float axis. The accelerometer is capable of determining movement in first, second, and third reference axes of a three-axis coordinate system. The first reference axes is in a predetermined relationship with the float axis. A float processor is operatively connected to the accelerometer. A sensor control module comprising a sensor processor is provided. A sensor cable is operatively connected between the float processor and the sensor processor. A reference point anchored to the fixed reservoir is defined. During operation of the fluid level sensing system, a position of the reference point is fixed within the three-axis coordinate system. A first portion of the sensor cable is arranged at the reference point. A second portion of the sensor cable is fixed relative to the float enclosure such that the sensor cable tethers the float enclosure relative to the reference point and allows movement of the float enclosure such that the float axis is movable relative to the first, second, and third axes of the three-axis coordinate system. The accelerometer is caused to generate and transfer to the float processor a first set of data representative of movement along the first reference axis, a second set of data representative of movement along the second reference axis, and a third set of data representative of movement along the third reference axis. The float processor is caused to generate and transfer to the sensor processor pitch data associated with the float enclosure based on the first, second, and third sets of data. The sensor processor is caused to generate at least one of a status signal and a control signal based on the pitch data generated by the float processor.

The present invention may also be embodied as a fluid level monitoring and alerting system for sensing the level of fluid within a fixed reservoir containing fluid, comprising an indicator, a sensor float assembly, a sensor control module, a sensor cable, and a reference point. The indicator is capable of indicating a status of the fluid monitoring system. The sensor float assembly comprises a float enclosure defining a float chamber and a float axis and an accelerometer arranged within the float chamber in a fixed orientation relative to the float axis. The accelerometer is capable of determining movement in at least first, second, and third reference axes of a three-axis coordinate system. The first reference axes is in a predetermined relationship with the float axis. A float processor is operatively connected to the accelerometer. The sensor control module comprises a sensor processor. The sensor cable is operatively connected between the float processor and the sensor processor. The reference point is associated with a fixed point. During operation of the fluid level monitoring and alerting system, a position of the reference point within the three-axis coordinate system is fixed. A first portion of the sensor cable is arranged at the reference point and a second portion of the sensor cable is fixed relative to the float enclosure such that the sensor cable tethers the float enclosure to the reference point and allows movement of the float enclosure such that the float axis is movable relative to the first, second, and third axes of the three-axis coordinate system. The accelerometer generates and transfers to the float processor a first set of data representative of movement along the first reference axis, a second set of data representative of movement along the second reference axis, and a third set of data representative of movement along the third reference axis. The float processor generates and transfers to the sensor processor pitch data associated with the float enclosure based on the first, second, and third sets of data. The sensor processor generates at least one of a status signal and a control signal based on the pitch data generated by the float processor. The indicator is operated based on the control signal.

DETAILED DESCRIPTION

Figure 1:
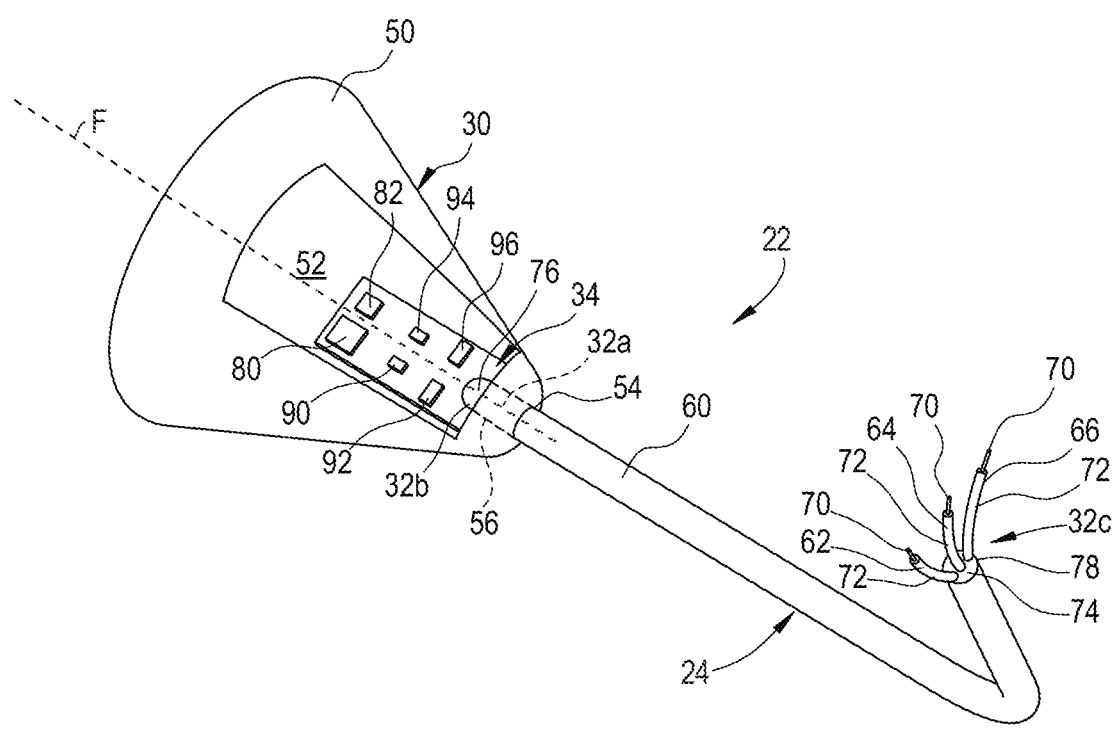
FIG. 1 is a cutaway view of a first example sensor float assembly and sensor cable.
Figure 2:
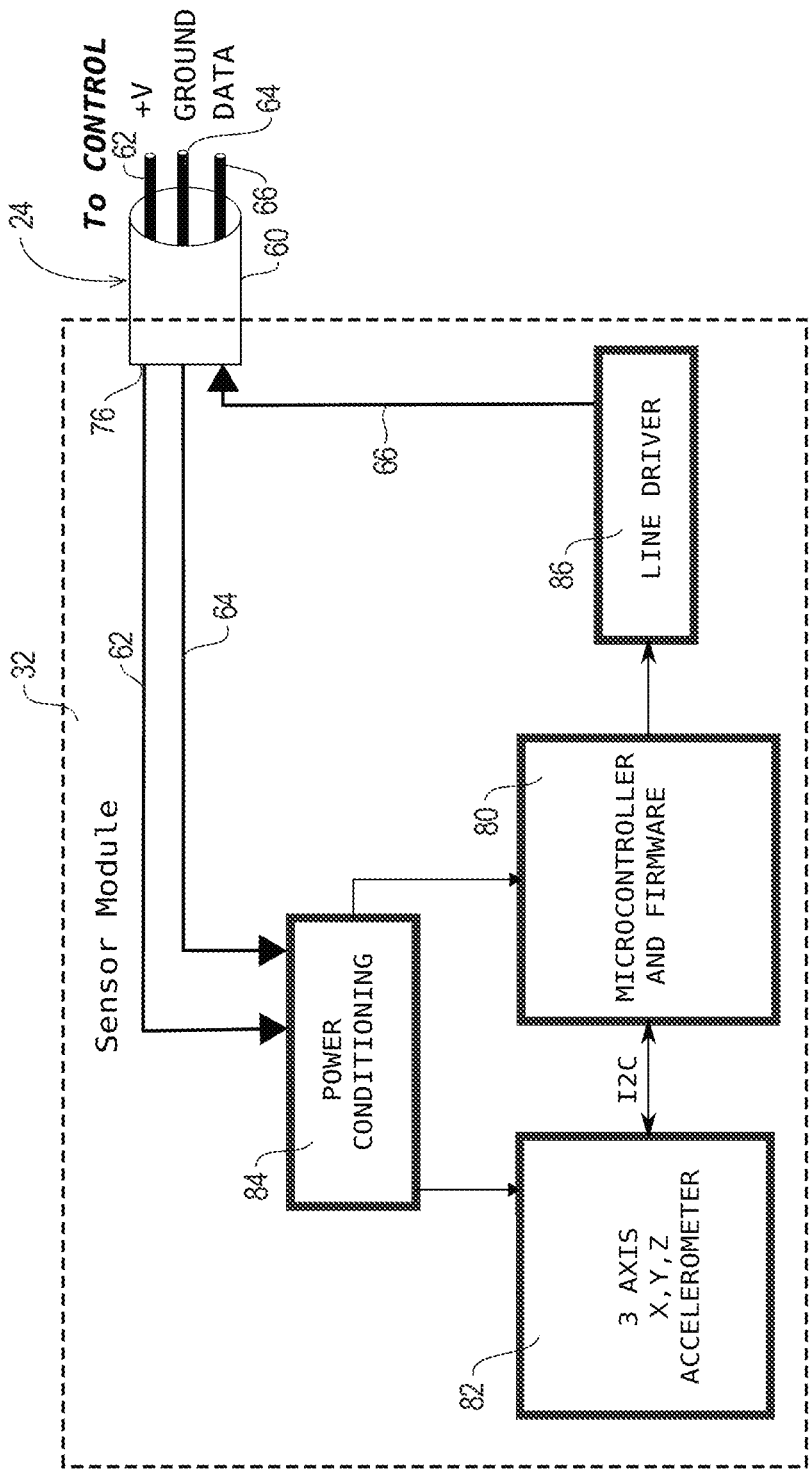
FIG. 2 is a module level block diagram of float electronic module of the sensor float assembly.
Figure 3:
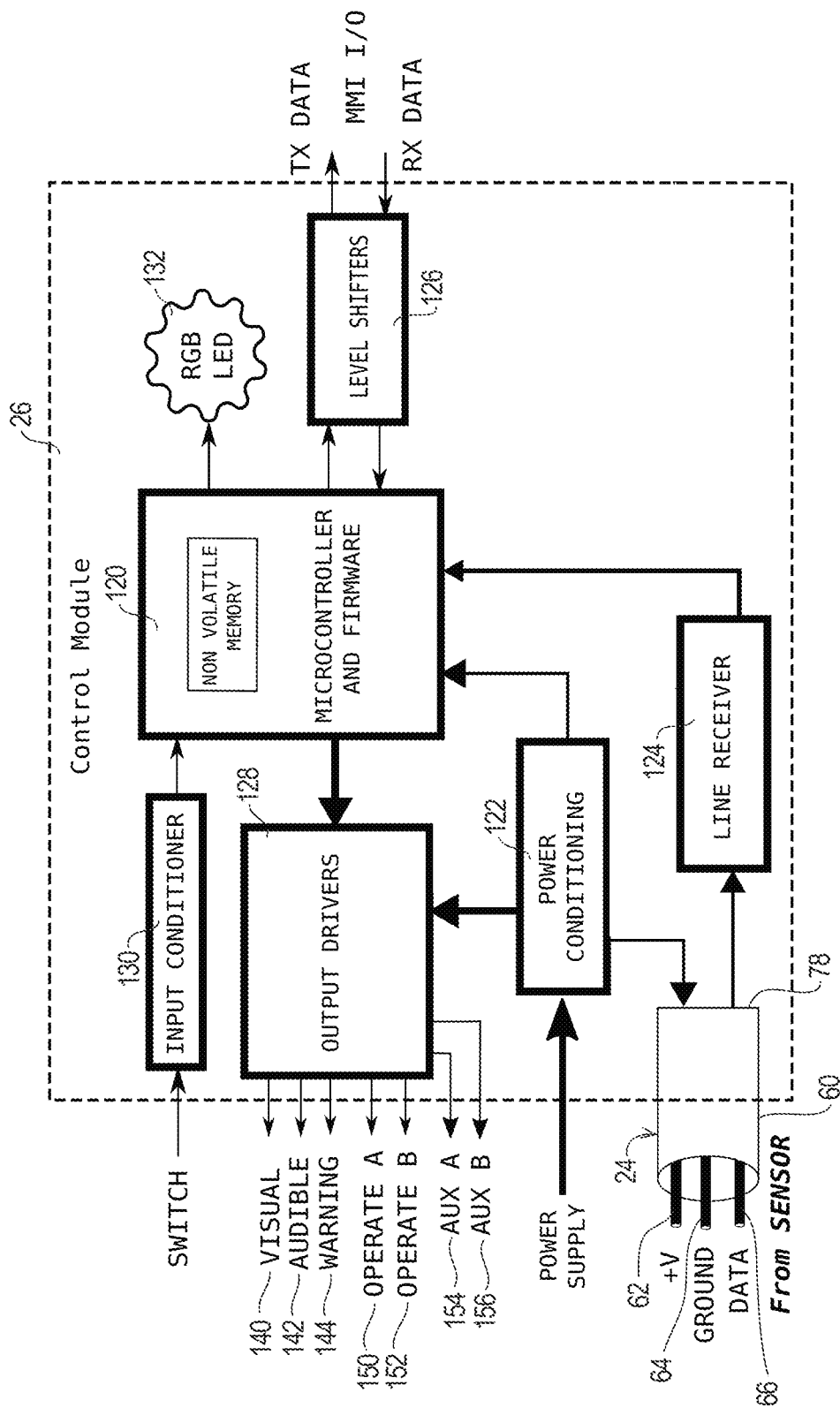
FIG. 3 is a module level block diagram of the sensor electronic module.
Figure 4:
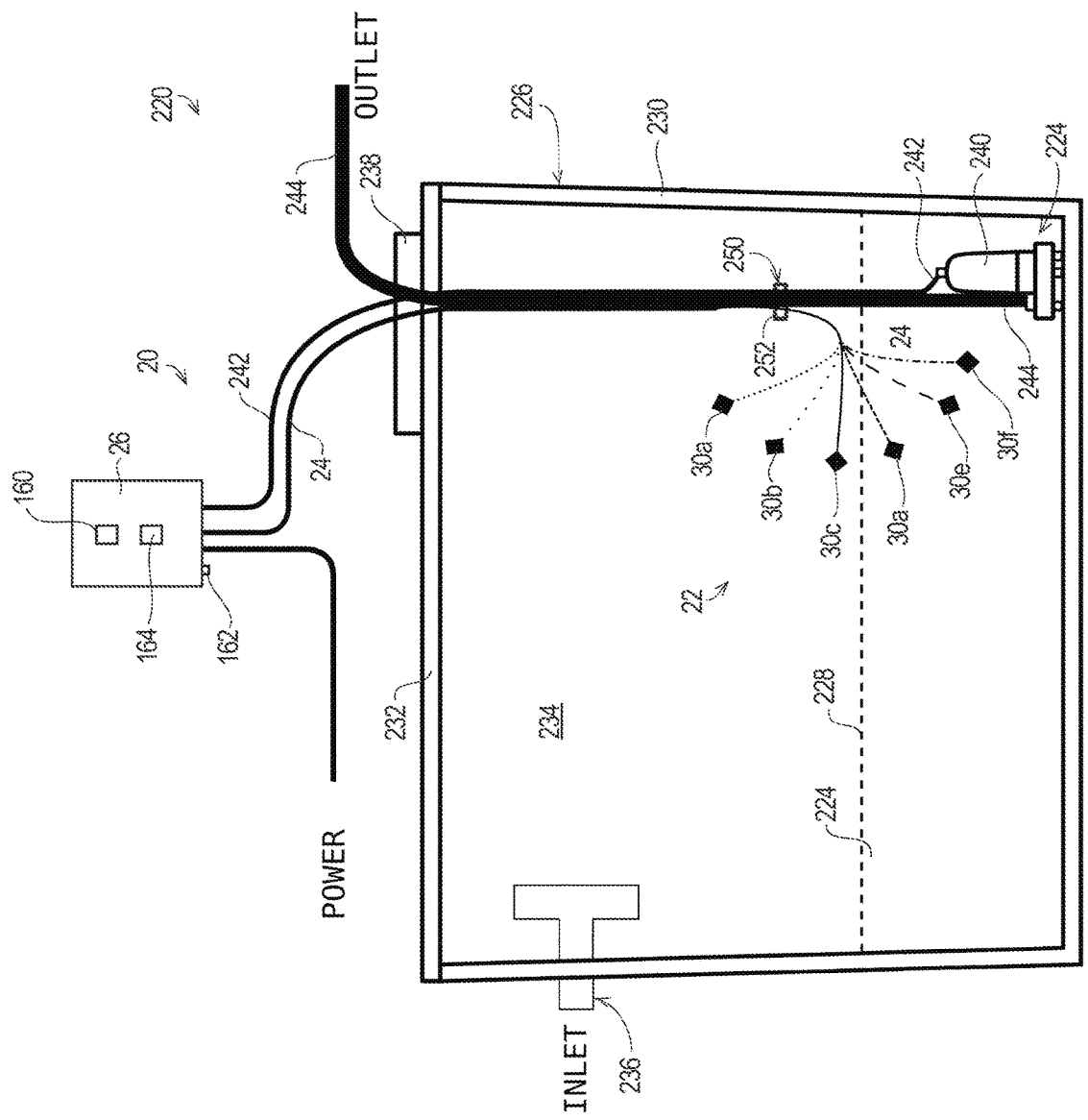
FIG. 4 is a drawing of a pump down system incorporating the first example sensor float assembly.

Referring initially to FIGS. 1-4 of the drawing, depicted therein is an example fluid level sensing system 20 constructed in accordance with, and embodying, the principles of the present invention. The example fluid level sensing system 20 comprises a sensor float assembly 22 as shown in FIGS. 1, 2, and 4, a sensor cable 24 as shown in FIGS. 1-4, and a sensor control module 26 as shown in FIGS. 3 and 4.

The example sensor float assembly 22 is configured to be buoyant such that the sensor float assembly 22 floats on the surface of a liquid. The sensor float assembly 22 further defines a float axis F and is supported by the sensor cable 24 such that an angle of the float axis F relative to vertical (hereinafter "pitch angle") varies when the level of the liquid supporting the sensor float assembly 22 varies. The angle of float assembly 22 relative to the float axis F (hereinafter "roll angle") also varies when the level of the liquid supporting the sensor float assembly 22 varies. At least one of the pitch angle and the roll angle are communicated to the sensor control module 26, and the sensor control module 26 determines a level of the liquid based at least in part on at least one of the pitch angle and the roll angle.

The present invention is of particular significance when the sensor control module 26 determines the level of the liquid supporting the float assembly 22 based on both the pitch angle and the roll angle, and that application of the present invention will be described herein. Further, to improve the measurement of pitch and/or roll angles, the pitch and/or roll angles of relative to the float axis F are corrected by incorporating measurements along axes in addition to the float axis F defining the pitch and/or roll angles. In particular, if the float axis F corresponds to the X-axis of a 3-axis coordinate system further comprising a Y-axis and a Z-axis, measurements taken along the Y-Axis and the Z-axis are used to correct the pitch and/or roll angles relative to the float axis F.

It should be noted that the coordinate system defined by the float axis F may be a coordinate system other than a Cartesian coordinate system (e.g., spherical coordinate system), that the float axis F need not be aligned with the X-axis of a three-axis Cartesian coordinate system (e.g., float axis F may be aligned with Y-axis or Z-axis), and the float axis F may offset from the axes of a Cartesian coordinate system so long as the relationship between the float axis F and the coordinate system is maintained.

With the foregoing general understanding of the present invention in mind, the details of the first example fluid level sensing system 20 will now be described in detail. The example fluid level sensing system 20 will then be described in the context of a first and second example fluid level monitoring and control systems. Finally, a second example fluid level sensing system will be described.

I. First Example Fluid Level Sensing System

The first example sensor float assembly 22 comprises a float enclosure 30 and a float electronics module 32. As will also be described in further detail below, the example float electronics module 32 and the example sensor control module 26 comprise electronic components that may be configured to determine a level of a liquid that supports the float enclosure 30 and to monitor and control a system incorporating that liquid based on the sensed liquid level.

The example float enclosure 30 comprises a shell 50 defining a shell chamber 52, a shell opening 54, and a float axis F. The shell 50 is sized and dimensioned such that the float electronics module 32 may be at least partly arranged within the shell chamber 52. Typically, the float electronics module 32 is entirely arranged within the shell chamber 52 as illustrated in FIG. 1 and fixed relative to the float axis F. Further, the example shell opening 54 is sized and dimensioned to receive a sealed portion 30*a* of the example cable 30 such that a first cable end 30*b* of the cable 30 is within the shell chamber 52 and a second cable end 30*c* of the cable 30 is outside of the shell chamber 52.

A seal 56 is formed between the shell 50 at the shell opening 54 and the transition portion 30*a* of the cable 30 to prevent liquids and gasses outside of the shell 50 from coming into contact with any portion of the sensor electronics 32 within the shell chamber 52. In the example sensor float assembly 22, the shell 50 is integrally molded around the sensor cable 24 such that the seal 56 is integrally formed where shell 50 comes into contact with the sensor cable 24. Alternatively, the seal 56 may be formed by a chemical sealant or mechanical seal assembly capable of maintaining the seal 56 between the shell 50 and the sensor cable 24 where shell 50 comes into contact with the sensor cable 24.

The example sensor cable 24 comprises a sheath 60 and first, second, and third wires 62, 64, and 66. Each of the wires 62 comprises a conductor 70 and an insulating coating 72. The sheath 60 is a continuous, hollow cylinder defining a sheath chamber 74 and first and second conductor openings 76 and 78. At least a portion of each of the wires 62, 64, and 66 is disposed within the conductor chamber 70. In the example sensor cable 24, intermediate portions 62*a*, 64*a*, and 66*a* of the wires 62, 64, and 66, respectively, are arranged within the sheath chamber 74. First ends 62*b*, 64*b*, and 66*c* of the wires 62, 64, and 66, respectively, extend from the sheath chamber 74 through the first conductor opening 76 into the shell chamber 52 and are electrically connected to the float electronics module 32. Second ends 62*c*, 64*c*, and 66*c* of the wires 62, 64, and 66, respectively, extend from the sheath chamber 74 through the second conductor opening 78 and are electrically connected to the sensor control module 26.

As will be described in further detail below, the example float enclosure 30 is configured to float in liquid, and the example sensor cable 24 is capable of functioning as a tether to limit movement of float enclosure 30 relative to a fixed point. The example shell 50 and sheath 60 are made of one or more materials that are compatible with any liquids and/or gasses in the environment in which the example sensor float assembly 22 is to be used. Accordingly, the shell 50 and the sheath 60, in combination with the seal 56, co-operate to define a substantially fluid-tight chamber that extends from the shell chamber 52 to the sensor control module 26.

Turning now to FIG. 2, the float electronics module 32 will now be described in further detail. FIG. 2 illustrates that the example float electronics module 32 comprise a float microcontroller 80, an accelerometer 82, a float power system 84, and a float line driver system 86. FIG. 1 illustrates that the float power system 84 comprises a float power conditioning circuit 90 and a sensor transient protection circuit 92. FIG. 1 further illustrates that the line driver system 86 comprises a float signal output driver 94 and a float signal transient protection circuit 96. The accelerometer 82 is secured within the float enclosure 30 in a fixed spatial relationship relative to the float axis F. Typically, the float electronics module 32 will take the form of a printed circuit board comprising the components 80, 82, 90, 92, 94, and 96 as depicted in FIG. 1.

Referring now back to FIG. 2, the float power system 84 is connected to the first and second wires 62 and 64 and to the float microcontroller 80, the accelerometer 82, and the float line driver system 86. FIG. 2 further illustrates that data may be bidirectionally transferred between the float microcontroller 80 and the accelerometer and that data may be transferred from the float microcontroller 80 to the float line driver system 86. In other configurations, data may be bidirectionally transferred between the float microcontroller 80 and the float line driver system 86. The float line driver system 86 is in turn connected to the third wire 66, and data may be bidirectionally transferred between the float line driver system 86 and electrical components connected to the third wire 66.

FIG. 2 further illustrates that the first wire 62 carries a power signal, the second wire 64 is connected to system ground, and the third wire 66 is configured to carry data. Accordingly, electrical power is provided to the various components 80, 82, 90, 92, 94, and 96 through the first and second wires 62 and 64, and data is transmitted from the float electronics module 32 through the third wire 66.

Turning now to FIG. 3 of the drawing, the example sensor control module 26 will now be described in detail. The example sensor control module 26 comprises a sensor microcontroller 120, a sensor power conditioning system 122, a sensor line receiver 124, a sensor communications port 126, and a sensor output driver system 128. The example sensor control module 26 further comprises an input conditioner 130 and a light (e.g., LED) 132.

The microcontroller 120 comprises software (e.g., firmware) capable of running software implementing logic to process input data from one or more input data sources. The software running on the microcontroller 120 is further capable of generating output signals, such as a first set of output signals 140, 142, and 144 and a second set of output signals 150, 152, 154, and 156. The output drivers 128 condition the output signals generated by the microcontroller 120 as appropriate for a particular device external to the sensor control module 26 as will be described in further detail below.

The input conditioner 130, the light 132, and the first set of output signals 140, 142, and 144 may be configured to form a user interface system that allows a user to enter commands into and perceive data from the sensor control module 26. In particular, the input conditioner 130 may be operatively connected to a switch (not shown in FIG. 3) that allows the user to enter commands into the sensor microcontroller 120. Software running on the sensor microcontroller 120 may illuminate the light 132 to communicate status information to the user. The output signals 140, 142, and 144 may be connected to one or more external user interface devices such as displays, speakers, bells, lights, buzzers, or the like to allow the sensor microcontroller 120 to communicate status information to the user. The first set of output signals 140, 142, and 144 will also be referred to as user interface output signals.

The second set of output signals 150, 152, 154, and 156 may be configured to control external operational devices such as pumps, valves, and the like. Software running on the sensor microcontroller 120 may generate the output signals based on input signals such as the status of any switch connected to the input conditioner 130 and/or based on data received from the sensor float assembly 22 as will be described in further detail below.

The power conditioner 122 is connected to an external source of electrical power and conditions an electrical power signal from the external source as appropriate for use by the sensor control module 26 and by the float electronics module 32 as will be described in further detail below. Also as will be described in further detail below, the line receiver 124 is configured to receive a data signal from the float electronics module 32 and input the data signal to the sensor microcontroller 120 as appropriate.

The level shifters 126 are configured to allow the sensor control module 26 to communicate data to and from a remote external device such as a main controller or human-machine interface (not shown). The remote external device is optional, and the sensor control module 26 may be configured to operate as a standalone device. If the sensor control module 26 is used with a remote external device such as a main controller, the main controller may be configured to monitor and control the components of a larger fluid processing system (not shown) including a fluid level monitoring and control system formed by the sensor float assembly 22 and the sensor control module 26.

As shown in FIG. 4, the example sensor control module 26 further comprises a visual indicator (e.g., light) 160, audible communicator 162 (e.g., buzzer), and control switch 164. Based on the processed accelerometer data, the sensor control module 26 further determines whether the visual indicator 160 should be illuminated or dark and whether audible communicator 162 should be active or silent. The sensor control module may further be configured such that depressing the control switch 164 silences the audible communicator 162.

When a 3-axis accelerometer is used as depicted in FIGS. 1-4, error may be introduced into the calculation of pitch angle and roll angle when the measured axis of interest is not aligned with the gravity plane. In particular, the example accelerometer 82 provides one or both of an analog voltage or digital value representing the acceleration force acting on a sprung proof mass. At rest, an accelerometer will report a value of 1 g upwards (approximate) when the axis of the accelerometer device is in the plane of gravity (or parallel with the surface of the earth). However, as the orientation of the device along the axis changes, the reported value reflects these changes in a sinusoidal manner and equal to the sine of the angle between the horizon and the axis. The angle of inclination can be computed using the inverse sine function on the reported value as shown in below:

$$\text{angle} = \sin^{-1}(Xg) \qquad (1).$$

Accordingly, when the accelerometer is tilted along any axis other than the axis of interest, the total acceleration from gravity is reduced and influences the measured values associated with the axis of interest. This influence can have significant adverse effects on the measured value.

To improve the accuracy of the measured value associated with the axis of interest, the example fluid level sensing system 20 compensates for this influence by measuring and incorporating the values from other axes.

Using a three-axis accelerometer that generates values within a three-dimension Cartesian coordinate system (X-axis, Y-axis, Z-axis), the adverse influence on measurements associated with the X-axis may be compensated for by incorporating measurements associated with the Y-axis and the Z-axis into the X-axis angle calculation(s).

The software (e.g., firmware) running on the microprocessor 80 determines the corrected pitch angle of the orientation of the sensor float assembly 22 by retrieving the measured values from accelerometer 82 for the X-axis, the Y-axis, and the Z-axis and then processing these values through a running average filter. These filtered values are then used in calculating the pitch angle by using an inverse tangent function applied to the ratio of the X-axis value to the Root Sum Square value derived from the Y-axis and the Z-axis. The result in radians is then converted to degrees by multiplying the result by 180, and then the product is divided by Pi. An offset value of 90 is added to produce a positive pitch angle from 0 to 179 degrees.

An example of 'C' code for calculating pitch is as follows:

$$pitch = (((a\tan 2(Xg, sqrt(Yg*Yg+Zg*Zg))*180.0)/PI)+90) \quad (2)$$

where Xg, Yg, & Zg, are the individual acceleration measurements from the accelerometer for each axis (the "g" stands for "gravity") a three-axis coordinate system.

Pitch can also be calculated without using the RSS as represented the following example 'C' code:

$$pitch = (((a\tan 2(Xg, Yg+Zg))*180.0)/PI)+90). \quad (3)$$

where Xg, Yg, & Zg, are the individual acceleration measurements from the accelerometer for each axis a three-axis coordinate system.

The roll angle is similarly calculated from the filtered values using an inverse tangent function applied to the ratio of the Y-axis value to the Root Sum Square value derived from the X-axis and the Z-axis. This result in radians is converted to degrees by multiplying the result by 180 and then dividing the product by Pi. An offset value of 180 is added to produce the roll angle from 0 to 359 degrees.

An example of 'C' code for calculating pitch is as follows:

$$roll = (((a\tan 2(Yg, sqrt(Xg*Xg+Zg*Zg))*180.0)/PI)+180) \quad (4)$$

where Xg, Yg, & Zg, are the individual acceleration measurements from the accelerometer for each axis of a three-axis coordinate system.

Once corrected values representative of pitch and/or roll have been calculated, the line driver 86 electrically connects and disconnects the third (data) cable 66 data conductor with the signal cable ground conductor at precisely timed moments as controlled by microprocessor 80. The signaling to line driver 86 is produced by microprocessor 80 to generate a data packet formatted as a serial data stream. In the example fluid level sensing system 20, the serial data stream contains data associated with message parameters and contents including sensor type, sensor operational status, pitch angle, roll angle, and a cyclic redundancy check or checksum of the data stream.

The sensor float assembly 22 may be configured for pulse width modulated (PWM) output. In this case, the line driver 86 provides a PWM waveform on the third (data) cable 66 data conductor with the conducting duration directly proportional to the pitch angle, with the pulse widths at specific times typically 250 ms, spanning 1 ms at 0 degrees and 180 ms at 179 degrees. The 1 ms pulse width for 0 degrees is used in verifying signal continuity.

The sensor float assembly 22 may be configured for analog output. In this case, the line driver 86 provides an output voltage on the third (data) cable 66 data conductor that is proportional to the calculated pitch angle, with the output voltage at specific levels, typically spanning 500 mV at 0 degrees and 4500 mV at 179 degrees. The 500 mV bias for 0 degrees is used in verifying signal continuity.

The interaction between the software running on the float microcontroller 80 of the float electronics module 32 and the sensor microcontroller 120 of the sensor control module 26 will now be described in further detail with reference to FIGS. 3 and 4.

A number of operating parameters, including timedose on/off times and sensor angle setpoints are stored in non-volatile memory by the sensor microcontroller 120. These operating parameters may be modified using the sensor communications port 126. In particular, the communications port 126 may be connected to a separate system controller (not shown) defining an external user interface that allows the operating parameters to be changed manually or programmatically or by user input or through an internal user interface such as buttons, display, and/or touch screen (not shown).

Operating power for the float electronics module 32 disposed in the container assembly 226 is supplied from the sensor control module 26 through the power conductor 62 and ground conductor 64 of the sensor cable 24. Signaling data is present on the data conductor 66, which is in turn electrically connected to the line receiver 124. The line receiver 124 in turn provides a signal compatible for further processing by the sensor microprocessor 120.

The sensor microprocessor 120 decodes the data packet received from the float electronics module 32, verifying the validity of the received data packet and extracting from the data packet values representative of status and pitch angle. In the example fluid level sensing system 20, a valid data packet is expected to be available every 500 milliseconds, and a sensor fault condition is triggered if more than a programmable amount (typically ten) sequential packets go missing or fail error checks. When a sensor fault is detected, the light 132 is illuminated blue. In the example fluid level sensing system 20, the visual indicator 160 and audible communicator 162 are also activated.

If no fault condition is detected, the sensor pitch value and status is evaluated and light 132 illumination color is updated reflecting the sensor orientation and status. The duty cycle of the light 132 is updated with controller status. The visual indicator 160 and the audible communicator 162 are updated to indicate status and any abnormal conditions such as high or low level, sensor errors, and other faults. It should be noted that the light 132 functions can also be implemented on the visual indicator 160.

II. First Example Fluid Monitoring and Control System

Referring now to FIG. 4 of the drawing, depicted therein is a first example fluid level monitoring and control system 220 comprising the example fluid level sensing system 20 as described above and a pump system 222. The example fluid level monitoring and control system 220 is used to control the level of liquid 224 within a container assembly 226. The liquid 224 defines a fluid level 228 that changes as the fluid 226 is introduced into and removed from the container assembly 226.

The liquid 224 may be any fluid capable of displacing the float enclosure 30 when the fluid level 228 changes. The container assembly 226 is made of materials and configured as suitable for use with the liquid 224 to be pumped by the fluid level monitoring and control system 220.

The example container assembly 226 comprises a vessel 230 and a lid 232. The container assembly 226 defines a container chamber 234, a container inlet 236 and a container outlet 238. In the example container assembly 226, the vessel 230 defines the container inlet 236, and the lid 232 defines the container outlet 238. In other configurations, the container inlet 236 may be formed in the lid 232, and the container outlet 238 may be formed in the vessel 230.

FIG. 4 illustrates that the example sensor float assembly 22 is located within the container chamber 234, while the sensor control module 26 is located outside of the container chamber 234. The sensor cable 24 extends between the sensor control module 26 and the sensor float assembly 22 through the container outlet 238.

FIG. 4 also illustrates that the pump system 222 comprising a pump 240, a pump cable 242, and a pump outlet conduit 244. The example pump 240 is arranged within the container chamber 234. The pump cable 242 extends between the sensor control module 26 and the pump 240 through the container outlet 238. The pump outlet conduit 244 extends from the pump 240 to the exterior of the container chamber 234 through the container outlet 238.

As shown in FIG. 4, in the example fluid level monitoring and control system 220 a reference portion 250 of the sensor cable 24 is fixed to the pump outlet conduit 244 at a reference point 252. The reference point 252 is at a predetermined height within the container chamber 234 relative to the pump 240.

The float enclosure 30 is buoyant and the example sensor cable 24 is at least partly deformable to allow the float enclosure 30 to move relative to the reference point 252 as the fluid level 228 changes. In FIG. 4, the example float enclosure 30 is capable of moving along a continuum of positions indicated by reference characters 30a-30f, with the position associated with reference character 30a at or near the highest detectable fluid level and reference character 30f at or near the lowest detectable fluid level.

Because the float enclosure 30 is in contact with the liquid 224 contained by the container assembly 226, as the liquid level 228 elevation changes the orientation of the float enclosure 30, and the float electronics module 32 contained within the float enclosure 30, changes. The orientation of the float electronics module 32 determines the orientation of the accelerometer 82. The example accelerometer 82 is a 3-axis (x, y, z) accelerometer capable of generating accelerometer data corresponding to the orientation of the accelerometer 82. The accelerometer data 82 is transferred to the float microcontroller 80 to obtain processed accelerometer data that is then transmitted from the float microcontroller 80 to the sensor controller 120 through the sensor line driver 86, the third wire 66, and the sensor line receiver 124.

The processed accelerometer data contains information indicative of a pitch angle of the float enclosure 30 as the float enclosure 30 moves through the various positions 30a through 30f. In particular, the sensor cable 24 is secured relative to the float enclosure 30 and to the reference point 252. Further, the sheath 60 and wires 62, 64, and 66 are sufficiently flexible to allow movement of the float enclosure 30 as shown in FIG. 4 but sufficiently rigid that an angle of the float axis F changes with respect to the fluid level 228 as the float enclosure 30 moves with varying fluid levels. The positions of the float enclosure 30 depicted in FIG. 4 thus correspond to different angular orientations of the float axis F. The angular orientation of the float axis F relative to true vertical will be referred to herein as pitch angle. In the example fluid level sensing system 20, the pitch angle may be from 0° to 179°. The sensor control module 26 processes the processed accelerometer data to determine if the pump 240 should be energized or de-energized.

The positions 30a-f depicted in FIG. 4 represent a plurality of setpoints having both a high value and low value. The pitch angle must be greater than the high value for the setpoint to indicate the setpoint is active and less than the low value to indicate the setpoint is clear. This provides an adjustable window for setpoint activation and allows the use of hysteresis to compensate for the effects of sensor noise and liquid turbulence.

Each setpoint and its corresponding state can be disabled by setting both the high and low setpoint values to zero. This enables a subset of conditions to be acted upon such as stop and start, stop, start, and high level, or the like.

The first example fluid level monitoring and control system 220 depicted in FIG. 4 may be configured as a conventional typical pump down system, and that application of the example fluid level sensing system 20 will now be described in further detail.

If the sensor control module 26 is configured to empty the liquid 224 in container assembly 226 in a demand dosing fashion, the software running on the sensor controller 120 evaluates the reported sensor pitch angle The pitch angle is then evaluated for equivalence with one or more of the predetermined setpoints.

When the reported value is less than or equal to a low level setpoint corresponding to position 30f, a low level state is set. When the reported value is less than a stop level setting setpoint corresponding to the position 30e and greater than the low level setpoint, an idle state is set. When the reported value is greater than the stop level setting setpoint and less than a start level setpoint corresponding to orientation 30d, an idle state is set. When the reported value is greater than the start level setting setpoint and less than a warning level setpoint corresponding to orientation 30c, a run state is set. When the reported value is greater than the warning level setpoint and less than an override level setpoint corresponding to orientation 30b, a warning state is set. When the reported value is greater than the override level setpoint and less than a high level setpoint corresponding to position 30a, an override state is set. When the reported value is greater than the high level setpoint, a high level state is set.

When the low level state is set, the color of the light 132 is set to Magenta, the output driver 128 is configured to control the visual indicator 160 to indicate status, activate the audible indicator 162, to clear the warning signal is cleared, to clear the operate A signal, and to clear the operate B signal.

When the idle state is set, the light 132 color is set to green, and the output driver 128 is configured to control the visual indicator 160 to indicate status, to deactivate the audible indicator 162 (silent), to clear the warning signal, to clear the operate A signal, and to clear the operate B signal.

When the run state is set, the color of the light 132 is set to yellow, the output driver 128 is configured to control the visual indicator 160 to indicate status, to deactivate the audible indicator 162 (silent), to clear the warning signal, to set the operate A signal, and to clear the operate B signal. When the operate A signal is set, the pump 240 is operated to cause the fluid 224 to flow from the container assembly 230 through the outlet conduit 244.

When the warning state is set, the light 132 color is set to Orange, and the output driver 128 is configured to control the visual indicator 160 to indicate status, to activate the audible indicator 162, to set the warning signal, to set the operate A signal, and to clear the operate B signal. When the operate A signal is set the pump 240 is operated to cause the fluid 224 to flow from the container assembly 230 through the outlet conduit 244.

When the override state is set, the color of the light 132 is set to Orange, and the output driver 128 is configured to control the visual indicator 160 to indicate status, to clear the audible indicator 162, to set the warning signal, to set the operate A signal, and to set the operate B signal. When the operate A signal is set, the pump 240 is operated to cause the fluid 224 to flow from the container assembly 230 through the outlet conduit 244. When the operate B signal is sent an additional pump is operated to increase the fluid 224 flow from the container 230 (not shown).

When the high level state is set, the color of the light 132 is set to Red, and the output driver 128 is configured to control the visual indicator 160 to indicate status, to activate the audible indicator 162, to set the warning signal, to set the operate A signal, and to set the operate B signal.

While the invention is configured to empty the liquid 224 in a time dosing fashion, operation is similar to demand dosing with the inclusion of on time and off time counters to precisely control operation duration of operate A and operate B signals generated by the output drivers 308.

III. Second Example Fluid Monitoring and Control System

Figure 5:
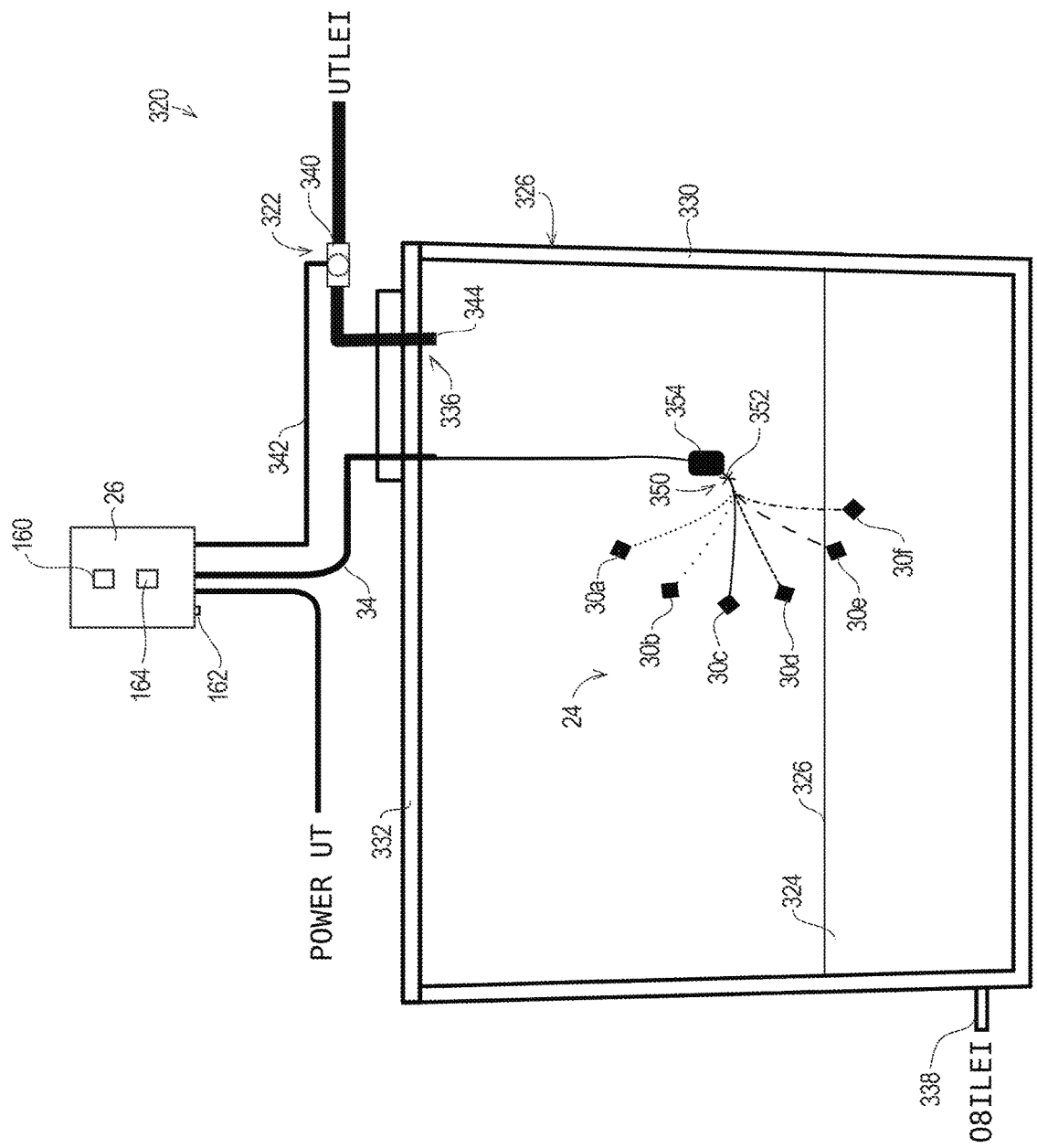
FIG. 5 is a drawing a fill up system incorporating the first example float assembly.

Referring now to FIGS. 3 and 5 of the drawing, depicted therein is a second example fluid level monitoring and control system 320 comprising the example fluid level sensing system 30 as described above and a valve system 322. The example fluid level monitoring and control system 320 is used to control the level of liquid 324 within a container assembly 326. The liquid 324 defines a fluid level 328 that changes as the fluid 326 is introduced into and removed from the container assembly 326.

The liquid 324 may be any fluid capable of displacing the float enclosure 30 when the fluid level 328 changes. The container assembly 326 is made of materials and configured as suitable for use with the liquid 324 to be pumped by the fluid level monitoring and control system 320.

The example container assembly 326 comprises a vessel 330 and a lid 332. The container assembly 326 defines a container chamber 334, a container inlet 336 and a container outlet 338. In the example container assembly 326, the vessel 330 defines the container outlet 338, and the lid 332 defines the container inlet 336. In other configurations, the container outlet 338 may be formed in the lid 332, and the container inlet 336 may be formed in the vessel 330.

FIG. 5 illustrates that the example sensor float assembly 22 is located within the container chamber 334, while the sensor control module 26 is located outside of the container chamber 334. The sensor cable 34 extends between the sensor control module 26 and the sensor float assembly 22 through the lid 332.

FIG. 5 also illustrates that the valve system 340 comprising a valve 340, a valve cable 342, and an inlet conduit 344. The valve cable 342 extends between the sensor control module 36 and the valve or 340. The inlet conduit 344 extends through the valve 340 from the exterior of the container chamber 334 to the interior of the container chamber 334.

As shown in FIG. 5, in the example fluid level monitoring and control system 320 a reference portion 350 of the sensor cable 34 is held at a reference point 352 by a weight 354. The reference point 352 is at a predetermined location within the container chamber 334.

As shown in FIG. 5, the example float enclosure 30 is capable of moving along a continuum of positions indicated by reference characters 30a-30f, with the position associated with reference character 30a at or near the highest detectable fluid level and reference character 30f at or near the lowest detectable fluid level.

Because the float enclosure 30 is in contact with the liquid 324 contained by the container assembly 326, as the liquid level 328 elevation changes the orientation of the float enclosure 30, and the float electronics module 32 contained within the float enclosure 30, changes. The orientation of the float electronics module 32 determines the orientation of the accelerometer 82. The example accelerometer 82 is a 3-axis (x, y, z) accelerometer capable of generating accelerometer data corresponding to the orientation of the accelerometer 82. The accelerometer data 82 is transferred to the float microcontroller 80 to obtain processed accelerometer data that is then transmitted from the float microcontroller 80 to the sensor controller 120 through the sensor line driver 86, the third wire 66, and the sensor line receiver 124.

The second example fluid level monitoring and control system 320 forms a fill up system, and the operation of the second example fluid level monitoring and control system 320 will now be described with reference to FIGS. 3 and 5.

In particular, the second example fluid level monitoring and control system 320 is configured to fill the container assembly 326 with the liquid 324 while the sensor controller 120 evaluates the reported sensor pitch angle for equivalence with set points associated with positions 30a-f associated with various liquid levels 328.

When the reported value of is less than or equal to an empty setpoint 30f, an empty state is set. When the reported value is less than a boost level setting 30e and greater than the empty setpoint 30f, a boost state is set. When the reported value is greater than boost level setting 30e and less than a warn level setpoint 30d, a warning state is set. When the reported value is greater than the warn level setpoint 30d and less than a start level 30c, a low state is set. When the reported value is greater than the start level setpoint 30c and less than a stop level 30b, a fill state is set. When the reported value is greater than the stop level setting 30b and less than a high level 30a, an idle state is set. When the reported value is greater than the high level setting, a high level state is set.

When the empty state is set, the color of the light 132 is set to magenta, and the output drivers 128 are set such that the visual indicator 160 indicates status, the audible indicator 162 is active, the warning signal is set, the operate A signal is set, and the operate B signal is set. When the operate A and operate B signals are set, the valve 340 is opened to allow fluid 324 to enter the container assembly 330 through the inlet conduit 344.

When the boost state is set, the color of the light 132 is set to Magenta, the output drivers 128 set the visual indicator 160 to indicate status, the audible indicator 162 is audible is set to active, the warning signal is set, the operate A signal is set, and operate B signal is set.

When the warning state is set, the color of the light 132 is set to Orange, and the output drivers 128 set the visual indicator 160 to indicate status, the audible indicator 162 is deactivated, the warning signal is set, the operate A signal is set, and the operate B signal is cleared.

When the low state is set, the color of the light 132 is set to Yellow, and the output drivers 128 set the visual indicator 160 to indicate status, the audible indicator 162 is deactivated, the warning signal is cleared, the operate A signal is set, and the operate B signal is cleared.

When the fill state is set, the color of the light 132 is set to Yellow, and the output drivers 128 set the visual indicator 160 to indicate status, the audible indicator 162 is deactivated, the warning signal is cleared, the operate A signal is set, and the operate B signal is cleared.

When the idle state is set, the color of the light 132 is set to Green, and the output drivers 128 set the visual indicator 160 to indicate status, the audible indicator 162 is cleared, the warning signal is cleared, the operate A signal is cleared, and the operate B signal is cleared.

When the high level state is set, the color of the light 132 is set to Red, and the output drivers 128 set the visual indicator 160 to indicate status, the audible indicator 162 is active, the warning signal is cleared, the operate A signal is cleared, and the operate B signal is cleared.

IV. Second Example Fluid Level Sensing System

Figure 6A:
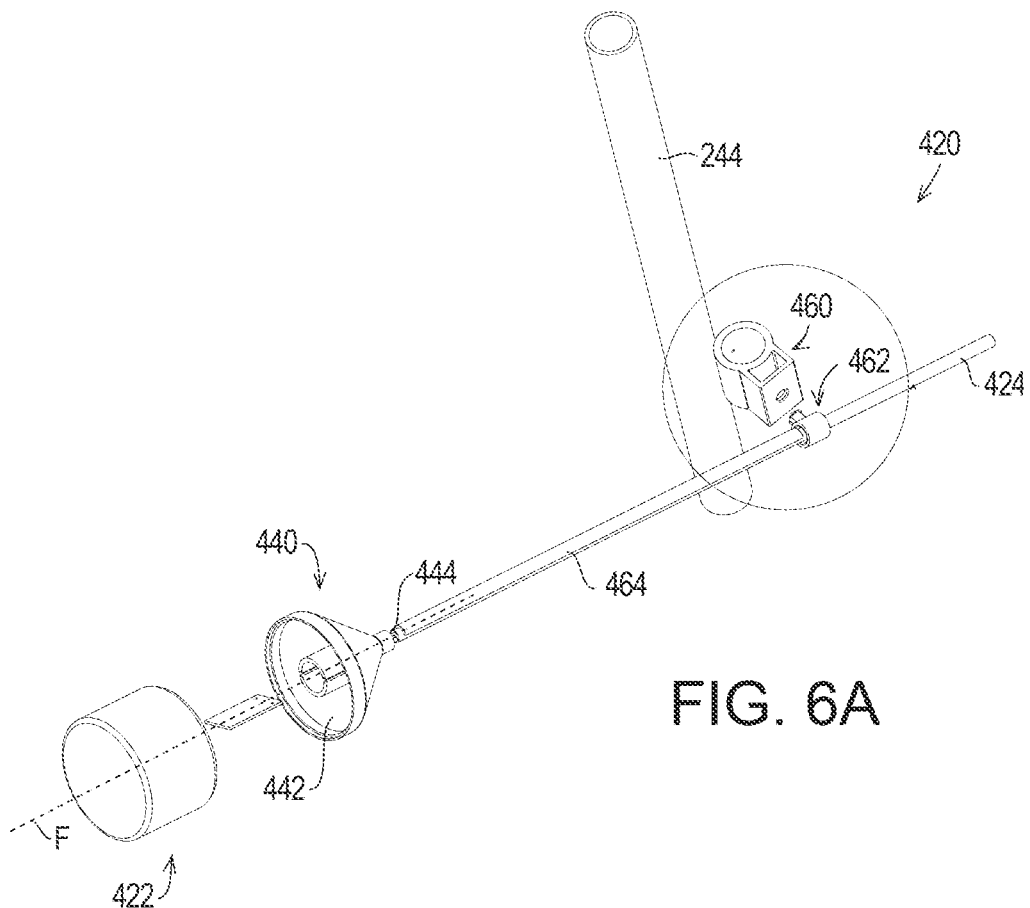
FIG. 6A is a drawing of a second example sensor float sensor assembly, with FIG. 6B being an enlarged detail of FIG. 6A.
Figure 6B:
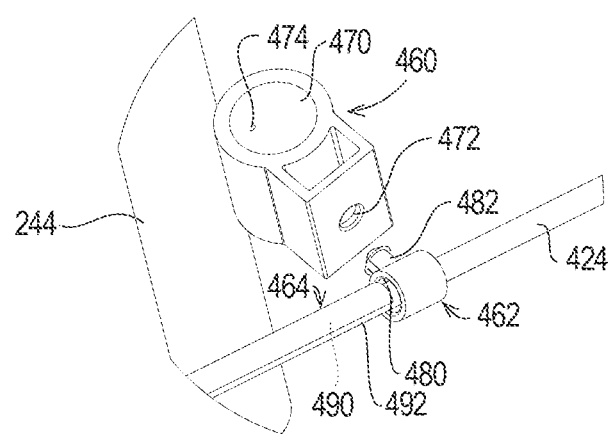

A second example fluid sensing system 420 will now be described with reference to FIGS. 6A and 6B. The second example fluid sensing system comprises a second example sensor float assembly 422 as shown in FIGS. 6A and 6B, a sensor cable 424 as shown in FIGS. 6A and 6B, and the sensor control module 26 as described above with reference to FIGS. 3 and 4.

The second example sensor float assembly 422 comprises a float enclosure 430 and a float electronics module 432. As with the float electronics module 32 described above, the float electronics module 432 and the example sensor control module 26 comprise electronic components that may be configured to determine a level of a liquid that supports the float enclosure 430 and to monitor and control a system incorporating that liquid based on the sensed liquid level.

The example float enclosure 430 comprises a shell 440 comprising defining a shell chamber 442, a shell opening 444, and a float axis F. The shell 440 is sized and dimensioned such that the float electronics module 432 may be at least partly arranged within the shell chamber 442. Typically, the float electronics module 432 is entirely arranged within the shell chamber 442 and fixed relative to the float axis F. A seal 56 is formed between the shell 440 at the shell opening 444 and the cable 430 to prevent liquids and gasses outside of the shell 440 from coming into contact with any portion of the sensor electronics 432 within the shell chamber 442.

In the example sensor float assembly 422, the shell 440 comprises a first shell portion 450 and a second shell portion 452 that are joined together to define the shell chamber 442.

The example float enclosure 440 is configured to float in liquid, and the example sensor cable 424 is capable of functioning as a tether to limit movement of float enclosure 30 relative to a fixed point.

The second example sensor float assembly 422 further comprises a clamp 460 adapted to be supported by a structure such as the output conduit 244 described above. The clamp 460 is further adapted to support a collar 462 which in turn rotatably supports a cable sleeve 464. The cable sleeve 464 at least partly surrounds the sensor cable 424 to limit deformation of the cable 424 during movement of the float enclosure 440 relative to the liquid the level of which is to be monitored.

FIG. 6B illustrates that the example clamp 460 defines a main opening 470 for receiving the output conduit 244, a pivot opening 472, and a lock opening 474. The example collar 462 defines a guide opening 480 and a pivot projection 482. The example cable sleeve 464 defines a sleeve chamber 490 and a slot 492. The main opening 470 is adapted to receive the structure such as the output conduit 244. The pivot opening 472 is sized and dimensioned to receive the pivot projection 482 to allow the collar 462 to pivot relative to the clamp 460. The lock opening 474 is sized and dimensioned to receive a set screw (not shown) or the like to fix a position of the clamp 460 relative to the structure to which the clamp 460 is attached.

The sensor cable 424 extends through the guide opening 480. At least a portion of the sensor cable 424 is further displaced through the slot 492 and into sleeve chamber 490. The collar 462 pivots relative to the clamp 460 to allow rotation of the cable 424 relative to a reference point defined by the clamp 460. However, the example sleeve 464 is relatively rigid in comparison to the sensor cable 424 and thus limits deflection of the sensor cable 424 during operation of the sensor float assembly 422.

What is claimed is:

1. A fluid level sensing system for sensing the level of fluid in relationship to a fixed point comprising:
 a sensor float assembly comprising
  a float enclosure defining a float chamber and a float axis,
  an accelerometer arranged within the float chamber in a fixed orientation relative to the float axis, where
   the accelerometer is capable of determining movement in at least first, second, and third reference axes of a three-axis coordinate system, and
   the first reference axes is in a predetermined relationship with the float axis,
  a float processor operatively connected to the accelerometer;
 a sensor control module comprising a sensor processor; and
 a sensor cable operatively connected between the float processor and the sensor processor; and
 a reference point defined as the fixed point; wherein
 during operation of the fluid level sensing system, a position of the reference point within the three-axis coordinate system is fixed;
 a first portion of the sensor cable is arranged at the reference point and a second portion of the sensor cable is fixed relative to the float enclosure such that the sensor cable
  tethers the float enclosure to the reference point, and
  allows movement of the float enclosure such that the float axis is movable relative to the first, second, and third axes of the three-axis coordinate system;
 the accelerometer generates and transfers to the float processor
  a first set of data representative of movement along the first reference axis,
  a second set of data representative of movement along the second reference axis, and
  a third set of data representative of movement along the third reference axis;
 the float processor generates and transfers to the sensor processor pitch data associated with the float enclosure based on the first, second, and third sets of data; and
 the sensor processor generates at least one of a status signal and a control signal based on the pitch data generated by the float processor.

2. The fluid level sensor as recited in claim 1, in which the float processor generates the pitch data by correcting raw pitch data associated with the first set of data using the second set of data.

3. The fluid level sensor as recited in claim 1, in which the float processor generates the pitch data by correcting raw pitch data associated with the first set of data using the second and third sets of data.

4. The fluid level sensor as recited in claim 1, in which the float processor generates the pitch data according to the following equation:

$$\text{pitch} = (((a\tan 2(Xg, \sqrt{Yg \cdot Yg + Zg \cdot Zg})) \cdot 180.0) / PI) + 90);$$

wherein Xg, Yg, & Zg, represent the first, second, and third sets of data generated by the accelerometer for the first, second, and third axes of the three-axis coordinate system, respectively.

5. The fluid level sensor as recited in claim 1, in which the float processor generates roll data according to the following equation:

$$\text{roll}=(((a\tan 2(Yg,\text{sqrt}(Xg*Xg+Zg*Zg))*180.0)/\text{PI})+180);$$

wherein Xg, Yg, & Zg, represent the first, second, and third sets of data generated by the accelerometer for the first, second, and third axes of the three-axis coordinate system, respectively.

6. The fluid level sensor as recited in claim 1, in which the float processor generates the pitch and roll data according to the following equations:

$$\text{pitch}=(((a\tan 2(Xg,\text{sqrt}(Yg*Yg+Zg*Zg))*180.0)/\text{PI})+90); \text{ and}$$

$$\text{roll}=(((a\tan 2(Yg,\text{sqrt}(Xg*Xg+Zg*Zg))*180.0)/\text{PI})+180);$$

wherein Xg, Yg, & Zg, represent the first, second, and third sets of data generated by the accelerometer for the first, second, and third axes of the three-axis coordinate system, respectively.

7. The fluid level sensor as recited in claim 1, in which the sensor float assembly further comprises a weight for anchoring a portion of the sensor cable at a desired location relative to the reservoir.

8. The fluid level sensor as recited in claim 1, in which the sensor float assembly further comprises a cable engaging member for engaging at least a portion of the sensor cable to limit deformation of the sensor cable.

9. The fluid level sensor as recited in claim 8, in which the cable engaging member comprises a cable sleeve attached to at least a portion of the sensor cable to limit deformation of the sensor cable.

10. The fluid level sensor as recited in claim 8, in which the cable engaging member comprises rigid material attached to at least a portion of the sensor cable to limit deformation of the sensor cable.

11. A fluid level monitoring and control system for sensing the level of fluid within a fixed reservoir containing fluid, comprising:
a fluid control device capable of controlling flow of fluid;
a sensor float assembly comprising
a float enclosure defining a float chamber and a float axis,
an accelerometer arranged within the float chamber in a fixed orientation relative to the float axis, where
the accelerometer is capable of determining movement in at least first, second, and third reference axes of a three-axis coordinate system, and
the first reference axes is in a predetermined relationship with the float axis,
a float processor operatively connected to the accelerometer;
a sensor control module comprising a sensor processor;
a sensor cable operatively connected between the float processor and the sensor processor; and
a reference point defined as the fixed point; wherein
during operation of the fluid level monitoring and control system, a position of the reference point within the three-axis coordinate system is fixed;
a first portion of the sensor cable is arranged at the reference point and a second portion of the sensor cable is fixed relative to the float enclosure such that the sensor cable
tethers the float enclosure to the reference point, and
allows movement of the float enclosure such that the float axis is movable relative to the first, second, and third axes of the three-axis coordinate system;
the accelerometer generates and transfers to the float processor
a first set of data representative of movement along the first reference axis,
a second set of data representative of movement along the second reference axis, and
a third set of data representative of movement along the third reference axis;
the float processor generates and transfers to the sensor processor pitch data associated with the float enclosure based on the first, second, and third sets of data;
the sensor processor generates at least one of a status signal and a control signal based on the pitch data generated by the float processor; and
the fluid control device is operated based on the control signal.

12. The fluid level monitoring and control system as recited in claim 11, in which the fluid control device is a pump.

13. The fluid level monitoring and control system as recited in claim 11, in which the fluid control device is a valve.

14. The fluid level monitoring and control system as recited in claim 11, in which the float processor generates the pitch and roll data according to the following equations:

$$\text{pitch}=(((a\tan 2(Xg,\text{sqrt}(Yg*Yg+Zg*Zg))*180.0)/\text{PI})+90); \text{ and}$$

$$\text{roll}=(((a\tan 2(Yg,\text{sqrt}(Xg*Xg+Zg*Zg))*180.0)/\text{PI})+180);$$

wherein Xg, Yg, & Zg, represent the first, second, and third sets of data generated by the accelerometer for the first, second, and third axes of the three-axis coordinate system, respectively.

15. A method of sensing fluid level within a fixed reservoir comprising the steps of:
providing a sensor float assembly comprising
a float enclosure defining a float chamber and a float axis,
an accelerometer arranged within the float chamber in a fixed orientation relative to the float axis, where
the accelerometer is capable of determining movement in first, second, and third reference axes of a three-axis coordinate system, and
the first reference axes is in a predetermined relationship with the float axis, and
a float processor operatively connected to the accelerometer;
providing a sensor control module comprising a sensor processor; and
operatively connecting a sensor cable between the float processor and the sensor processor;
defining a reference point anchored to the fixed reservoir;
during operation of the fluid level sensing system, fixing a position of the reference point within the three-axis coordinate system;
arranging a first portion of the sensor cable at the reference point;

fixing a second portion of the sensor cable relative to the float enclosure such that the sensor cable
  tethers the float enclosure relative to the reference point, and
  allows movement of the float enclosure such that the float axis is movable relative to the first, second, and third axes of the three-axis coordinate system;
causing the accelerometer to generate and transfer to the float processor
  a first set of data representative of movement along the first reference axis,
  a second set of data representative of movement along the second reference axis, and
  a third set of data representative of movement along the third reference axis;
causing the float processor to generate and transfer to the sensor processor pitch data associated with the float enclosure based on the first, second, and third sets of data; and
causing the sensor processor to generate at least one of a status signal and a control signal based on the pitch data generated by the float processor.

16. The method as recited in claim 15, in which the float processor generates the pitch data by correcting raw pitch data associated with the first set of data using the second and third sets of data.

17. The method as recited in claim 15, in which the float processor generates the pitch data according to the following equation:

$$\text{pitch} = (((a\tan 2(Xg, \text{sqrt}(Yg*Yg+Zg*Zg))*180.0)/PI)+90);$$

wherein Xg, Yg, & Zg, represent the first, second, and third sets of data generated by the accelerometer for the first, second, and third axes of the three-axis coordinate system, respectively.

18. The method as recited in claim 15, in which the float processor generates the roll data according to the following equation:

$$\text{roll} = (((a\tan 2(Yg, \text{sqrt}(Xg*Xg+Zg*Zg))*180.0)/PI)+180);$$

wherein Xg, Yg, & Zg, represent the first, second, and third sets of data generated by the accelerometer for the first, second, and third axes of the three-axis coordinate system, respectively.

19. The method as recited in claim 15, in which the float processor generates the pitch and roll data according to the following equations:

$$\text{pitch} = (((a\tan 2(Xg, \text{sqrt}(Yg*Yg+Zg*Zg))*180.0)/PI)+90); \text{ and}$$

$$\text{roll} = (((a\tan 2(Yg, \text{sqrt}(Xg*Xg+Zg*Zg))*180.0)/PI)+180);$$

wherein Xg, Yg, & Zg, represent the first, second, and third sets of data generated by the accelerometer for the first, second, and third axes of the three-axis coordinate system, respectively.

20. A fluid level monitoring and alerting system for sensing the level of fluid within a fixed reservoir containing fluid, comprising:
an indicator capable of indicating a status of the fluid monitoring system;
a sensor float assembly comprising
  a float enclosure defining a float chamber and a float axis,
  an accelerometer arranged within the float chamber in a fixed orientation relative to the float axis, where
    the accelerometer is capable of determining movement in at least first, second, and third reference axes of a three-axis coordinate system, and
    the first reference axes is in a predetermined relationship with the float axis,
  a float processor operatively connected to the accelerometer;
a sensor control module comprising a sensor processor;
a sensor cable operatively connected between the float processor and the sensor processor; and
a reference point associated with a fixed point; wherein
during operation of the fluid level monitoring and alerting system, a position of the reference point within the three-axis coordinate system is fixed;
a first portion of the sensor cable is arranged at the reference point and a second portion of the sensor cable is fixed relative to the float enclosure such that the sensor cable
  tethers the float enclosure to the reference point, and
  allows movement of the float enclosure such that the float axis is movable relative to the first, second, and third axes of the three-axis coordinate system;
the accelerometer generates and transfers to the float processor
  a first set of data representative of movement along the first reference axis,
  a second set of data representative of movement along the second reference axis, and
  a third set of data representative of movement along the third reference axis;
the float processor generates and transfers to the sensor processor pitch data associated with the float enclosure based on the first, second, and third sets of data;
the sensor processor generates at least one of a status signal and a control signal based on the pitch data generated by the float processor; and
the indicator is operated based on the control signal.

21. The fluid level monitoring and alerting system as recited in claim 20, in which the float processor generates the pitch and roll data according to the following equations:

$$\text{pitch} = (((a\tan 2(Xg, \text{sqrt}(Yg*Yg+Zg*Zg))*180.0)/PI)+90); \text{ and}$$

$$\text{roll} = (((a\tan 2(Yg, \text{sqrt}(Xg*Xg+Zg*Zg))*180.0)/PI)+180);$$

wherein Xg, Yg, & Zg, represent the first, second, and third sets of data generated by the accelerometer for the first, second, and third axes of the three-axis coordinate system, respectively.

22. The fluid level sensor as recited in claim 20, in which the cable engaging member comprises a cable sleeve attached to at least a portion of the sensor cable to limit deformation of the sensor cable.

23. The fluid level sensor as recited in claim 20, in which the cable engaging member comprises rigid material attached to at least a portion of the sensor cable to limit deformation of the sensor cable.

* * * * *